Nov. 22, 1966 W. M. MOORE 3,286,507
PENDULUM DENSITOMETER

Filed Feb. 27, 1964 3 Sheets-Sheet 1

William M. Moore
INVENTOR.
BY
ATTORNEYS

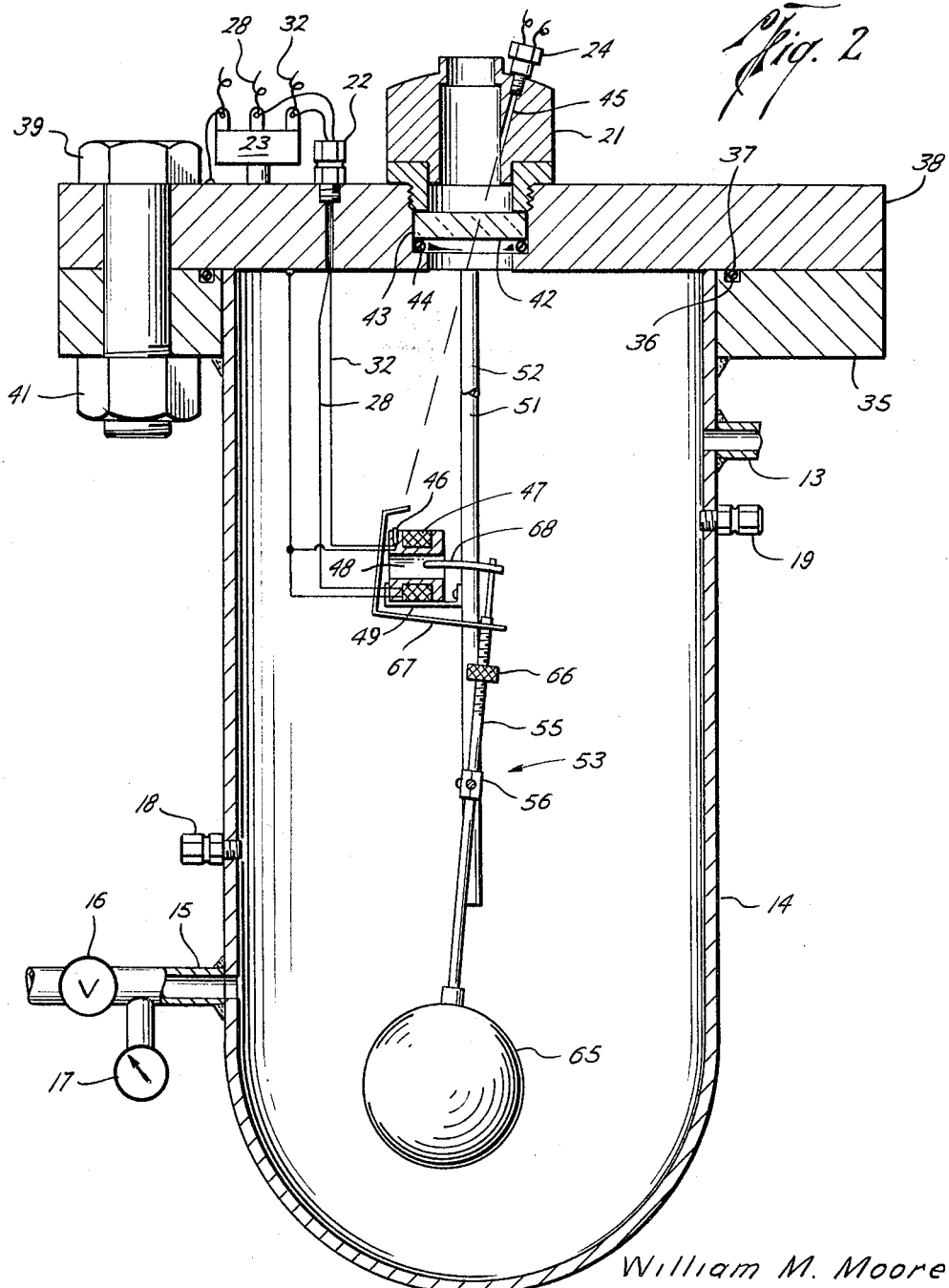

Nov. 22, 1966  W. M. MOORE  3,286,507
PENDULUM DENSITOMETER
Filed Feb. 27, 1964  3 Sheets-Sheet 3
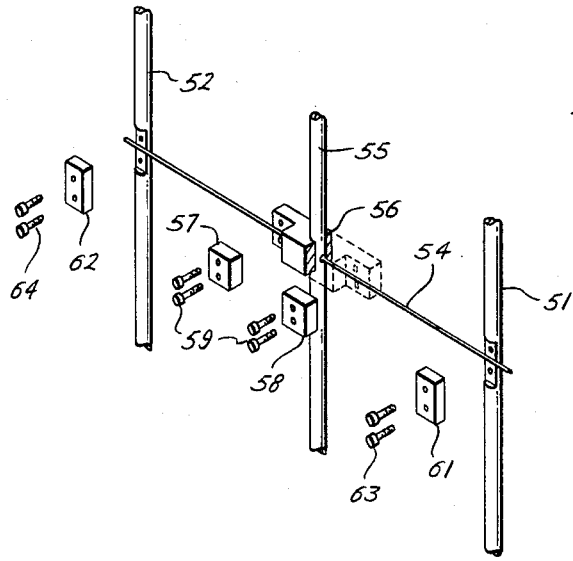
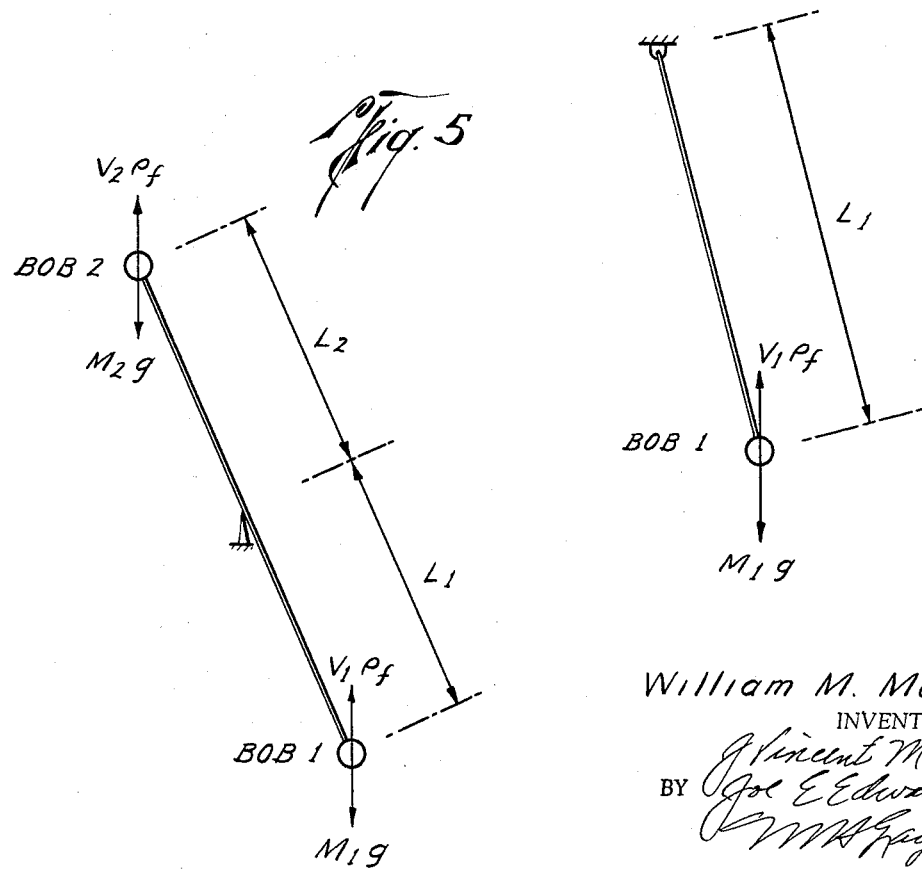
William M. Moore
INVENTOR.
BY
ATTORNEYS

United States Patent Office 3,286,507
Patented Nov. 22, 1966

3,286,507
PENDULUM DENSITOMETER
William M. Moore, Shreveport, La., assignor to United Gas Corporation, Shreveport, La., a corporation of Delaware
Filed Feb. 27, 1964, Ser. No. 347,733
22 Claims. (Cl. 73—30)

The present invention relates to a method and apparatus for measuring fluid density and more particularly to a method and apparatus for measuring fluid density by measuring the period of oscillation of a pendulum which is oscillated in the fluid whose density is to be measured.

An object of the present invention is to provide a method and apparatus for measuring fluid density as a function of the period of oscillation of a pendulum operating in the fluid.

Another object of the present invention is to provide a method and apparatus for measuring fluid density in which the measure of the period of oscillation of a pendulum oscillating in the fluid is determined by measuring the time between electrical impulses used to maintain the substantially uniform amplitude of the pendulum oscillation wherein these impulses are supplied at a definite point in the traverse of the pendulum.

Another object of the present invention is to provide a pendulum apparatus for measuring fluid density in which the pendulum is suspended to have a minimum frictional resistance to oscillation.

A still further object of the present invention is to provide an apparatus for measuring fluid density using a pendulum wherein components of the pendulum apparatus may be moved or varied to change the period sensitivity of the pendulum to changes in density of the fluid.

Still another object of the present invention is to provide an apparatus for measuring fluid density with a pendulum in which the period of the pendulum will increase with an increase in the fluid density.

Still another object of the present invention is to provide an apparatus for measuring fluid density with a pendulum in which the period of the pendulum will decrease with an increase in the fluid density.

A still further object of the present invention is to provide a method and apparatus for measuring fluid density with a pendulum device in which the amplitude of the pendulum oscillation is maintained substantially uniform by imparting a magnetic attraction to the pendulum at least once during each oscillation or during a predetermined number of oscillations.

Another object is to provide a method and an apparatus for measuring the density of a fluid flowing through a pipe line by continuously bleeding the fluid being measured from the pipe line to the measuring apparatus.

Other objects, features and advantages of the invention will be apparent from the specification, the drawings and the claims.

In the drawing wherein an illustrative embodiment of this invention is shown and wherein like reference numerals indicate like parts:

FIGURE 2 is a sectional view of the pendulum chamber and apparatus contained therein constructed in accordance with the principles of the present invention.

FIGURE 3 is an exploded view showing the components and method of mounting the pendulum.

FIGURE 4 is a schematic drawing illustrating the forces acting upon the pendulum of the single-bob type.

FIGURE 5 is a schematic drawing illustrating the forces acting upon the pendulum of the two-bob type.

Figure 1:
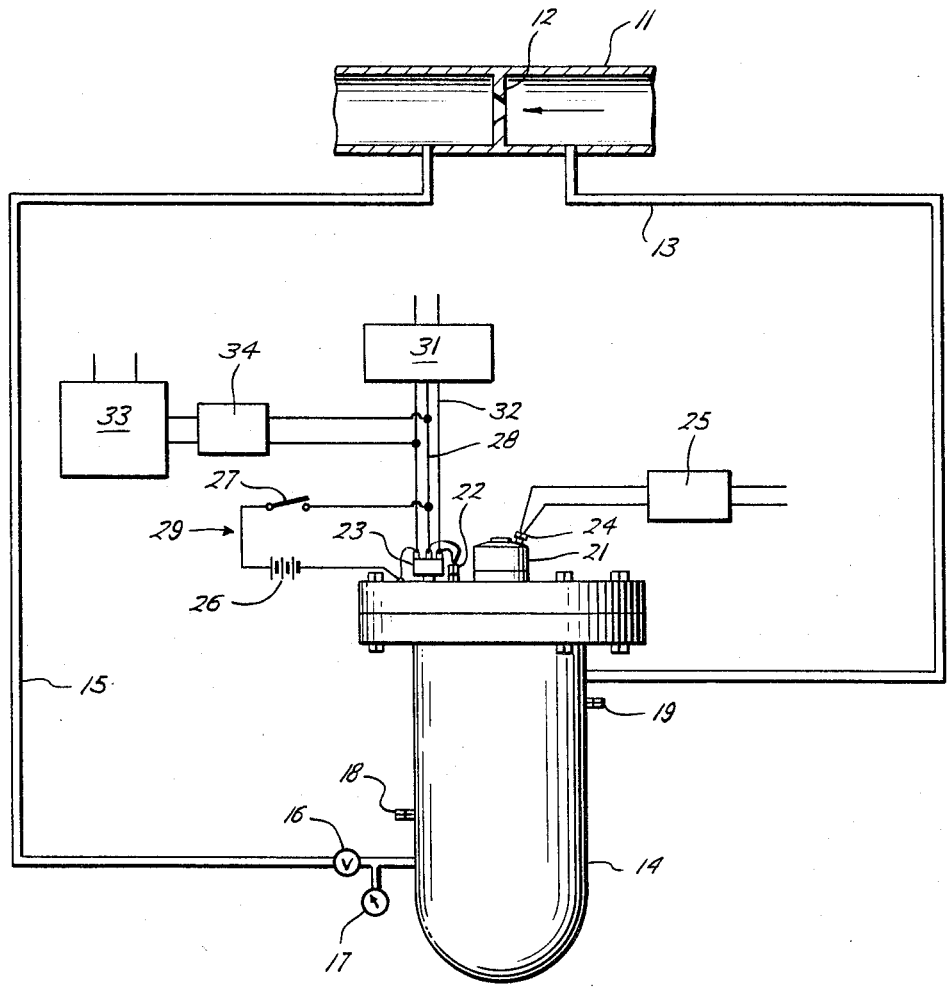
FIGURE 1 is a schematic illustration of the installation of the device of the present invention to a pipe line containing the fluid whose density is to be measured.

The method and apparatus for measuring a fluid density is accomplished by suspending a pendulum having known physical characteristics within a pendulum chamber in which the fluid whose density is to be measured is contained. The pendulum is oscillated and the period of the pendulum is determined. From prior calibrations the density of the fluid being measured may be directly determined from the period of the pendulum in the fluid.

With conditions of constant density and the amplitude of the pendulum oscillations reducing due to bearing friction and the dynamic frictional resistance of the fluid, the period of the pendulum will remain substantially constant. Therefore, to operate continuously, it is necessary to impart an oscillation to the pendulum having a predetermined amplitude and to maintain the oscillation having substantially the desired amplitude at all times during density measuring. This is done by imparting a slight force to the pendulum during a short portion of each oscillation which is just sufficient to maintain the desired amplitude of oscillaiton. A force may be imparted to the pendulum more than once during each oscillaiton or only once during two or more oscillations for the purpose of maintaining a substantially constant amplitude for continuous operations. Means for maintaining this desired amplitude may be of any suitable type as has been used in pendulum-type clocks to maintain the amplitude desired in the pendulum of a clock or of the type of device hereinafter more fully described and explained.

In any pendulum system, neglecting frictional forces and with the amplitude of the pendulum oscillations maintained substantially constant, two forces act upon the pendulum. These forces are graphically illustrated in FIGURES 4 and 5. Referring to FIGURE 4, it will be seen that the weight of the pendulum of a single-bob type will act downwardly and produce a force $M_1 g$ acting at a distance $L_1$ from the point of rotation. Also there will be a force acting upwardly through the center of gravity of the bob which will be directly related to the density of the fluid in which the pendulum is oscillating and such force is generally described as the displacement or buoyancy force and is shown to be $V_1 \rho / g$. Both of these forces act vertically on the pendulum at the distance $L_1$ distance from the pivot point of the pendulum.

The formula for determining the period of the single-bob pendulum is as follows:

$$(1) \qquad T = 2\pi \sqrt{\frac{I}{L_1 g (M_1 - V_1 \rho / g)}}$$

in which $I$ = the moment of inertia of the suspended mass (the pendulum assembly) about its axis of rotation
$L_1$ = the distance from the axis of rotation to the center of volume of bob 1
$g$ = the gravitational acceleration constant
$M_1$ = the mass of bob 1
$V_1$ = the outer displacement volume of bob 1
$\rho$ = the density of the ambient fluid, mass per unit volume.

From FIGURE 4 and Formula 1 above it can be seen that the weight, or the $M_1 g$ force, tends to return the pendulum to the vertical position and the buoyancy force $V_1 \rho / g$ tends to resist this return to vertical position. These factors are reflected in Formula 1 and it can be seen that Formula 1 demonstrates that the period T of the pendulum oscillation is related to the density of the fluid by virtue of the buoyant force exerted on the pendulum bob suspended in the fluid.

Referring to FIGURE 5, an illustration of the forces involved in a two-bob pendulum system is shown. The lower bob labeled bob 1 which is distance $L_1$ from the pivot point has both the gravitational and buoyancy forces hereinbefore explained which would be identical with those as shown in FIGURE 4, force $M_1 g$ exerted downwardly from the force $V_1 \rho / g$ exerted upwardly at the distance $L_1$ from the pivot point. The bob 2 will have two forces, a gravitational force $M_2 g$ exerted downwardly and a buoyancy force $V_2 \rho / g$ exerted upwardly, both a distance $L_2$ from the pivot point. The period of oscillation of the two-bob pendulum is given in the following formula:

$$(2) \quad T = 2\pi \sqrt{\frac{I}{L_1 g(M_1 - V_1 \rho / g) - L_2 g(M_2 - V_2 \rho / g)}}$$

in which $I$ = moment of inertia of the suspended mass (the pendulum assembly) about its axis of rotation
$L_1$ = the distance from the azis of rotation to the center of volume of bob 1
$L_2$ = the distance from the axis of rotation to the center of volume of bob 2
$g$ = the gravitational acceleration constant
$M_1$ = the mass of bob 1
$M_2$ = the mass of bob 2
$V_1$ = the outer displacement volume of bob 1
$V_2$ = the outer displacement volume of bob 2
$\rho$ = the density of the fluid in which the pendulum assembly is suspended, mass per unit volume.

From this equation it can be seen that the gravitational force $M_1 g$ on bob 1 and the buoyant force $V_2 \rho / g$ on bob 2 both tend to return the pendulum to the vertical position while the buoyant force $V_1 \rho / g$ on bob 1 and the gravitational force $M_2 g$ on bob 2 tend to resist the return of the pendulum to the vertical position.

As can be seen from (1) and (2) above, the period of the pendulums shown in FIGURES 4 and 5 both include the density of fluid factor $\rho$. Measurement of the pendulum period therefore may be calibrated to be a measurement of the fluid density. Also, in a two-bob pendulum, its period can be made to increase as density increases or to decrease as density increases. Further with a two-bob pendulum system any desired sensitivity can be obtained, i.e., the system can be made to prdouce a large change in period with a small change in fluid density or a small change in period with a large change in fluid density.

Assuming that it is desired to have a pendulum density measuring apparatus which has an increasing period as the fluid density increases, such apparatus requires that the bob with the greatest value of LMg also must have the greatest value of VL and must be the lower bob. Stated simply, to obtain an increase in period with an increase of density the bob having the greatest gravitationally produced torque about the pivot must also be the one having the greatest buoyant moment and also must be the lower bob, i.e., its gravitational moment must be greater than its buoyant moment resulting from the fluid density.

As may be seen from the figures and the formulas when the buoyancy forces resulting from greatly increased density are increased such that the summation of $V_1 \rho / g$ and $M_2 g$ is greater than $V_2 \rho / g$ plus $M_1 g$, the pendulum will invert and further increases in fluid density beyond the inversion point will decrease the period of the pendulum.

From the foregoing it can be seen that there are six factors which will relate to the sensitivity of the pendulum device to the change in density. These factors are the volumes of bobs 1 and 2, the mass of bobs 1 and 2, and the distances from the point of rotation to bob 1 and to bob 2.

It is particularly important in the device of the present invention that the chamber in which the pendulum oscillates be filled with the fluid whose density is to be measured and that the conditions of pressure and temperature in the chamber be maintained and known so as not to introduce other variables into the measurement system. It is also important that the velocity of the fluid within the chamber not be sufficient to cause any change in the period of the pendulum. The fluid may be introduced into the chamber at a controlled rate and discharged therefrom without having any appreciable effect on the accuracy of the density measurement, but care is taken to at all times insure that the velocity of the fluid flowing through the chamber does not affect the period of the pendulum.

From FIGURE 1 it can be seen that the fluid to be measured is flowing through pipe 11 in the direction as indicated by the arrow. Pipe 11 is provided with suitable restriction such as orifice plate 12 to provide a relatively small but sufficient pressure drop in pipe 11 to allow fluid to be conducted through line 13 into pendulum chamber 14 and returned from pendulum chamber 14 through line 15 into the downstream side of pipe 11. If it is desired that no pressure drop be created in pipe 11, then orifice plate 12 may be eliminated and line 15 vented to the atmosphere since valve 16 in line 15 may be set to vent a relatively small amount of fluid from pendulum chamber 14 whereby the fluid density within pendulum chamber 14 will be substantially the same as the fluid density flowing through pipe 11.

As is seen in FIGURE 1, pressure gauge 17 is connected into line 15 between valve 16 and pendulum chamber 14 to reflect the pressure of the fluid within pendulum chamber 14. Pendulum chamber 14 is also provided with thermocouple connections 18 and 19 for measuring and recording the temperature of the fluid within pendulum chamber 14. It is preferred to maintain the fluid temperature at approximately the same temperature as the temperature of the fluid flowing in pipe 11, and therefore line 13 and pendulum chamber 14 may be suitably insulated to maintain the fluid temperature within pendulum chamber 14 as near as possible to the fluid temperature within pipe 11.

The upper portion of pendulum chamber 14 is suitably flanged and is provided with viewing port and light mount 21, insulated electrical connection 22 extending into pendulum chamber 14 and electrical junction 23. Light 24 is connected by suitable wiring to power supply 25 which will convert standard 110-volt alternating current into a suitable low voltage direct current such as, for example, a 6-volt direct current supply.

Battery 26 is connected to ground on pendulum chamber 14 and to starting switch 27 which is connected to pulsing lead 28 forming the starting circuit 29 which is utilized to commence the pendulum oscillations as hereinafter more fully described. Pulse-emitting device 31 is connected through leads 28 and 32 into insulated electrical connection 22 through connections at electrical junction 23 and to the grounded side of battery 26 as shown. Pulse-emitting device 31 is essentially a monostable multivibrator in which a single output pulse is generated for each input pulse. Pulse-emitting device 31 is also connected to a suitable source of 110-volt alternating current. Pulse counter 33 is connected to pulsing lead 28 and to ground through impedance matching network 34. The pulse counter 33 is preferably a device which will count electric impulses wherein a first pulse starts the counting sequence and the next pulse stops the counting sequence whereby every other period of the pendulum will be counted. Also as shown, pulse counter 33 is provided with a suitable source of 110-volt alternating current.

As more clearly shown in FIGURE 2, pendulum chamber 14 is provided with flange 35 which is welded to the exterior of chamber 14 and provided with an annular groove 36 containing O-ring 37 for sealing with the surface of upper flange 38. Bolts 39 and nuts 41 extend through flanges 35 and 38 and clamp flange 38 over the top of pendulum chamber 14. Fitting 21 threadedly engages into the central portion of flange 38 and holds glass plate 42 within the recess 43. O-ring or other suitable sealing means 44 maintains a pressure seal between glass plate 42 and the bottom of recess 43. Light 24 is threaded into the upper portion of fitting 21 and fitting 21 is suitably bored to provide light passageway 45 from light 24 extending downwardly as shown in FIGURE 2.

As shown, leads 28 and 32 extend through insulated electrical connection 22 with lead 32 connecting to light-sensing device 46 and lead 28 connecting the electromagnetic coil 47. Coil 47 is annular in shape and provided with hollow core 48, the purpose of which is hereinafter more fully explained. Coil 47 and light-sensing device 46 are supported by bracket 49 which is suitably secured to depending supports 51 and 52. Supports 51 and 52 are suitably secured to the lower side of flange 38 and should be of sufficient strength or rigidity to provide a suitable providing support for pendulum assembly 53 which will be sufficiently stationary that it will not affect the period of the pendulum.

As shown in FIGURES 2 and 3, the pendulum assembly 53 is mounted by wire 54 to supports 51 and 52. Arm 55 of pendulum assembly 53 is surrounded by wire clamping block 56, a part of which is shown broken away and in dotted lines in FIGURE 3. Both arm 55 and block 56 are suitably drilled to receive wire 54. Clamping blocks 57 and 58 engage wire 54 and are suitably clamped against block 56 to tighten on wire 54 whereby wire 54 will not turn or rotate with respect to block 56 and arm 55. Screws 59 secure blocks 57 and 58 to block 56. Clamping blocks 61 and 62 engage within notches provided in supports 51 and 52, respectively, and clamp wire 54 therebetween. Screws 63 and 64 hold blocks 61 and 62 against supports 51 and 52 so that wire 54 will not rotate with respect to support 51 or support 52. It is preferred that wire 54 be maintained in tension.

With such a pendulum suspension system, the only friction in the support is the hysteresis or internal friction within wire 54. It should be noted that such a taut wire suspension produces a restoring torque on the pendulum assembly 53 that is essentially directly proportional to the angular displacement from the neutral position of the wire. This restoring torque is not undesirable unless its gradient or torque constant changes.

The usual knife-edged bearing support may be used in place of the taut wire suspension of the pendulum assembly 53, but it should be noted that such knife-edged bearing supports are limited in practical applications because of their susceptibility to the effects of vibrations and other disturbances.

In addition to arm 55 and the supporting mechanism shown in FIGURE 3, pendulum assembly 53 includes lower bob 65 and adjustable upper bob 66 which is in threaded engagement with the upper portion of arm 55. Flapper 67 is secured to the uppermost threaded portion of arm 55 and extends outwardly, upwardly and inwardly above light-sensing device 46 when pendulum assembly 53 is positioned as shown in FIGURE 2. Finger 68 is secured to the uppermost portion of arm 55 and extends within hollow core 48 of electromagnetic coil 47.

Before installation of the density measuring device of the present invention, as previously disclosed the device should be fully calibrated by operation of the device with a fluid of known density contained within pendulum chamber 14. Changes in density of the known fluid can be accomplished by changing the pressure of the fluid within pendulum chamber 14 at a known temperature and at each pressure the oscillation period of the pendulum is carefully timed. With the device calibrated, that is, with the period of pendulum oscillation known for the range of densities over which the device is to be used, it is then installed in fluid communication with the fluid whose density is to be measured as shown in FIGURE 1, or through any other suitable connections whereby pendulum chamber 14 will be filled with the fluid to be measured and the velocity of fluid flow through the chamber is limited to the extent that it will not affect the period of oscillation of the pendulum assembly 53.

In operation when the device has been connected as shown in FIGURES 1 and 2, the oscillation of the pendulum is commenced by starting circuit 29 whereby intermittent electric pulses are provided to electromagnetic coil 47 by opening and closing starting switch 27 thereby exerting an intermittent pull on finger 68. This may readily be accomplished manually by operating starting switch 27 while observing the movement of pendulum assembly 53 through fitting 21. As soon as pendulum assembly 53 has achieved an amplitude of oscillation sufficient that flapper 67 cuts off the light from light 24 to light-sensing device 46, starting switch 27 can be left open and the pulsing of pendulum assembly 53, whereby the amplitude of its oscillations is maintained, will operate as hereinafter more fully explained.

Each time light-sensing device 46 receives light from light 24 after having been shaded by flapper 67, light-sensing device 46 will send an electrical pulse through lead 32 to pulse-emitting device 31. Responsive to each pulse received, pulse-emitting device 31 will emit a pulse of predetermined duration through lead 28 into electromagnetic coil 47 causing finger 68 of pendulum assembly 53 to be attracted for the duration of the pulse. The pulses emitted from pulse-emitting device 31 are also carried through impedance matching network 34 to electronic pulse counter 33. Thus, for each complete oscillation of pendulum assembly 53 one pulse is emitted from light-sensing device 46 through leads 32 causing a pulse to be emitted from pulse-emitting device 31 which both attracts finger 68 through electromagnetic coil 47 and also actuates counter 33. Counter 33 should be of such a type that will count the number of pulses and also the total time between pulses counted so that, for example, an average period of oscillation may be measured by counting ten oscillations and also timing the period necessary for ten oscillations.

With a device which has been calibrated, the measurement of the period of pendulum assembly 53 will relate directly to the density of the fluid in chamber 14 and such fluid density can therefore be readily determined from the period and the calibration information.

Thus it can be seen that the present invention provides both method and apparatus for measuring the period of oscillation of a pendulum whereby through previous calibration of the device the density of the fluid contained within the pendulum chamber may be accurately determined.

The accuracy of measurement of the period of oscillation of the pendulum therefore will be dependent upon the accuracy of the counter. Therefore, an electronic counter in which a first pulse triggers the counter starting the counting sequence and the second pulse stops the counter ending the sequence whereby every other period of oscillation of the pendulum is counted. The method and apparatus of the present invention may be used on any gaseous fluid medium with care being taken to assure that the pendulum does not invert due to a great increase in density and therefore in the buoyant forces on the pendulum bob.

The foregoing disclosure and description of the invention are illustrative and explanatory thereof, and various changes in the method, as well as in the details of the illustrated construction, may be made within the scope of the appended claims without departing from the spirit of he invention.

What is claimed is:

1. The method of measuring the density of a gaseous fluid comprising, flowing the fluid to be measured to a pendulum chamber, oscillating a pendulum within said pendulum chamber, and timing the period of oscillation of said pendulum to determine the density of said fluid within said pendulum chamber.

2. The method of measuring the density of a gaseous fluid comprising, flowing the fluid to be measured to a pendulum chamber, oscillating a pendulum within said pendulum chamber, imparting a small force to the pendulum at a definite point in the traverse of the pendulum to maintain a substantially constant amplitude of the pendulum oscillations, and timing the period of oscillation of said pendulum to determine the density of said fluid in said pendulum chamber.

3. The method of measuring the density of a gaseous fluid comprising, flowing the fluid to be measured to a pendulum chamber, oscillating a pendulum within said pendulum chamber, imparting a small force to the pendulum once during each oscillation to maintain a substantially constant amplitude of the pendulum oscillations, and timing the period between the imparting of the small force to the pendulum to determine the period of oscillation of the pendulum as a measure of the density of said fluid in said pendulum chamber.

4. The method of measuring the density of a gaseous fluid comprising, flowing the fluid to be measured to a pendulum chamber, oscillating a pendulum within the pendulum chamber, imparting a small force to the pendulum once during each oscillation to maintain a substantially constant amplitude of the pendulum oscillations, and timing the period of oscillations of said pendulum.

5. The method of measuring the density of a gaseous fluid comprising, calibrating a pendulum within a pendulum chamber with a fluid of known density to determine the pendulum period of oscillation over an range of fluid densities, flowing the fluid to be measured into the pendulum chamber, actuating said pendulum to maintain a substantially constant amplitude of pendulum oscillation, and timing the pendulum period of oscillation whereby the density of the fluid being measured may be determined by comparison with the calibration of said pendulum period of oscillation.

6. The method of measuring the density of a gaseous fluid according to claim 5 wherein said timing of the pendulum period of oscillation includes the timing of a plurality of pendulum oscillations whereby an average period of oscillation may be determined and used for determining fluid density.

7. A gaseous fluid density measuring device comprising, a pendulum chamber, a fluid inlet into said pendulum chamber, a fluid outlet from said pendulum chamber, a pendulum mounted wthin said pendulum chamber for oscillation, means imparting oscillation to said pendulum, and means timing the period of oscillation of said pendulum.

8. A gaseous fluid density measuring device according to claim 7 wherein said means imparting oscillation to said pendulum comprises, a metal plunger attached to said pendulum, and an electromagnetic coil positioned to receive said plunger once during each complete oscillation of said pendulum.

9. A gaseous fluid density measuring device according to claim 7 including, means detecting each oscillation of said pendulum.

10. A gaseous fluid density measuring device according to claim 9 wherein said detecting means comprises a light mounted on said pendulum chamber, a light-sensing device within said pendulum chamber, said light being directed at said light-sensing device, and means on said pendulum interrupting said light to said light-sensing device once during each oscillation of said pendulum.

11. A gaseous fluid density measuring device according to claim 8 including, means emitting an electric pulse to said electromagnetic coil responsive to the oscillation of said pendulum whereby said means emits one pulse during each complete oscillation of said pendulum.

12. A gaseous fluid density measuring device according to claim 11 including, an adjustment on said pulse-emitting means for varying the length of electric pulse emitted whereby only sufficient pulse is emitted to said electromagnetic coil to maintain the desired amplitude of said pendulum.

13. A gaseous fluid density measuring device comprising, a pendulum chamber, a fluid inlet into said pendulum chamber, a fluid outlet from said pendulum chamber, a pendulum mounted within said pendulum chamber for oscillation, means imparting force to said pendulum to maintain the amplitude of the oscillations of said pendulum within said pendulum chamber substantially constant, means detecting each oscillation of said pendulum, means emitting pulse to said force imparting means responsive to the detection of each oscillation of said pendulum by said detection means, and means timing the period of oscillation of said pendulum.

14. A gaseous fluid density measuring device according to claim 13 wherein said timing means is actuated by the pulses emitted from said pulse-emitting means.

15. A gaseous fluid density measuring device comprising, a pendulum chamber, a fluid inlet into said pendulum chamber, a fluid outlet from said pendulum chamber, a pendulum mounted within said pendulum chamber for oscillation, said pendulum having at least one bob, means imparting oscillation to said pendulum, and means timing the period of oscillation of said pendulum.

16. A gaseous fluid density measuring device according to claim 15 including, means adjusting the sensitivity of said pendulum.

17. A gaseous fluid density measuring device according to claim 16 wherein said sensitivity adjusting means comprises a second bob movably attached to the arm of said pendulum.

18. A gaseous fluid density measuring device comprising, a pendulum chamber, a fluid inlet into said pendulum chamber, a fluid outlet from said pendulum chamber, means controlling the flow of fluid through said pendulum chamber, a pendulum mounted within said pendulum chamber for oscillation, said pendulum having two bobs,
said pendulum being mounted within said pendulum chamber by a taut wire mounting,
means imparting oscillation to said pendulum, and
means timing the period of oscillation of said pendulum.

19. A gaseous fluid density measuring device according to claim 18 wherein said oscillation-imparting means includes an electromagnetic coil imparting a small force to said pendulum once during each oscillation whereby the amplitude of oscillation is maintained substantially constant and wherein said timing means measures the period of time between actuations of said electromagnetic coil.

20. The method of measuring the density of a fluid, comprising
calibrating a pendulum within a pendulum chamber with a fluid of known density to determine the pendulum period of oscillation over a range of fluid density,
flowing the fluid to be measured into the pendulum chamber,
actuating said pendulum to maintain said preselected substantially constant amplitude of pendulum oscillation, and
timing the pendulum period of oscillation whereby the density of the fluid being measured may be determined by comparison with the calibration of said pendulum period of oscillation.

21. The method of measuring the density of a fluid flowing in a pipeline, comprising
flowing a portion of the fluid from the pipeline to a pendulum chamber,
oscillating a pendulum within the pendulum chamber,
imparting a small force periodically to the pendulum to maintain a substantially constant amplitude of pendulum oscillation,
timing the period of oscillation of said pendulum, and
discharging the fluid from the pendulum chamber at a relatively small flow rate to maintain low fluid velocity flow in said pendulum chamber.

22. The method of measuring the density of a fluid, comprising
flowing the fluid to be measured to a pendulum chamber,
oscillating a pendulum within the pendulum chamber,
periodically imparting a small force to the pendulum to maintain a substantially constant amplitude of the pendulum oscillations, and
timing the period of oscillations of said pendulum as a measure of the density of the fluid in the pendulum chamber.

References Cited by the Examiner

UNITED STATES PATENTS

| | | | |
|---|---|---|---|
| 404,997 | 6/1889 | Werner | 58—129 |
| 2,360,546 | 10/1944 | Cardwell | 73—32 |
| 2,550,052 | 4/1951 | Fay | 73—59 |

OTHER REFERENCES

Ashwin et al.: Journal of Scientific Instruments, vol. 37, December 1960, pp. 480–485.

RICHARD C. QUEISSER, *Primary Examiner.*

LAWRENCE R. FRANKLIN, *Assistant Examiner.*